Figure 1:
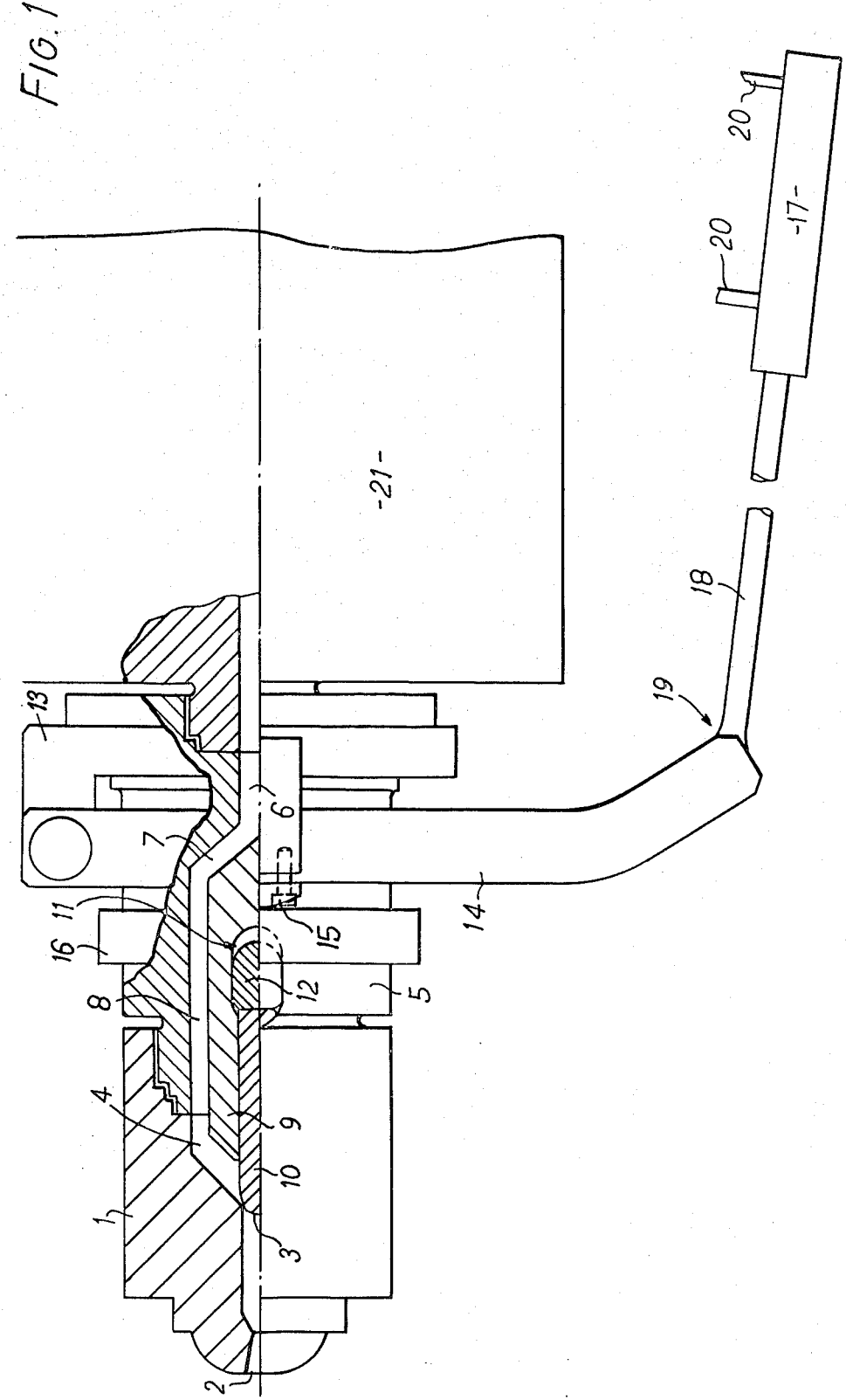

United States Patent [19]

Lynex et al.

[11] 3,924,811
[45] Dec. 9, 1975

[54] SHUT-OFF VALVES FOR THE NOZZLES OF INJECTION MOULDING MACHINES

[75] Inventors: Graham Lynex, Pelsall; Harold Tranter, Aldridge, both of England

[73] Assignee: British Industrial Plastics Limited, Manchester, England

[22] Filed: Dec. 6, 1974

[21] Appl. No.: 530,488

[52] U.S. Cl. ............... 239/533; 239/570; 239/584; 245/146
[51] Int. Cl.² ..................... B29F 1/03; B05B 1/30
[58] Field of Search ......... 239/91, 92, 95, 533, 570, 239/571, 583, 584; 425/DIG. 224, DIG. 225, 242 R, 245 R, 245 NS, 146

[56] References Cited
UNITED STATES PATENTS

| | | | |
|---|---|---|---|
| 1,701,089 | 2/1929 | VonSalis | 239/533 |
| 1,973,666 | 9/1934 | Sidney | 239/533 |
| 2,420,550 | 5/1947 | Miller | 239/533 X |
| 3,037,245 | 6/1962 | Darnell | 425/245 X |
| 3,371,384 | 3/1968 | Novel | 425/146 |
| 3,398,436 | 8/1968 | Novel | 425/146 |
| 3,633,823 | 1/1972 | Steiger | 239/533 X |

*Primary Examiner*—James B. Marbert
*Assistant Examiner*—Andres Kashnikow
*Attorney, Agent, or Firm*—Cushman, Darby & Cushman

[57] ABSTRACT

An injection moulding machine nozzle device as a valve body defining a passageway which communicates with a bore in the nozzle, a valve member movable to open and close a throat defined in the bore, and a fluid pressure-operable device arranged and adapted to permit opening and closing movement of the valve member with response to the throat.

1 Claim, 2 Drawing Figures

SHUT-OFF VALVES FOR THE NOZZLES OF INJECTION MOULDING MACHINES

This invention concerns improvements in or relating to shut-off valves for the nozzles of injection moulding machines.

One form of shut-off valve used at present in injection moulding machines between the injector screw of the machine and the discharge orifice of the nozzle is the so-called "gas tap" type of valve, in which a valve member with a through-bore is rotatably mounted in a valve body so that rotation of the valve member opens or closes the bore. This type of valve is difficult to clean.

Another form of such valve comprises a valve member spring-urged to close a throat in the passageway of the nozzle, the spring having a compression rating which is intended to cause the valve to open when plastics material in the passageway is compressed to a predetermined injection pressure. This arrangement, however, gives no positive control over the opening and closing of the valve, since the spring must be changed if the injection pressure requires alteration, and the springs tend to lose their resilience by reduction of temper during use.

The present invention provides a nozzle device for an injection moulding machine, including a valve body having a passageway therein communicating with a bore in the nozzle, a valve member movable to open and close a throat in the bore, and a fluid pressure-operable device arranged and adapted to effect opening and closing movement of the valve member.

Preferably the valve member is movable under the influence of pressurized moulding material to open the throat; preferably the downstream end of the valve member is profiled so that a component of the force exerted thereon by the pressurized moulding material acts in an axial direction tending to open the throat.

Preferably the fluid pressure-operable device includes a hydraulic piston and cylinder device operable from the hydraulic system of the injection moulding machine to which the nozzle device is to be fitted.

Preferably also the valve body includes a thrust assembly adapted to transfer thrust from the fluid pressure-operable device to the valve member to effect closure of the throat.

Figure 2:
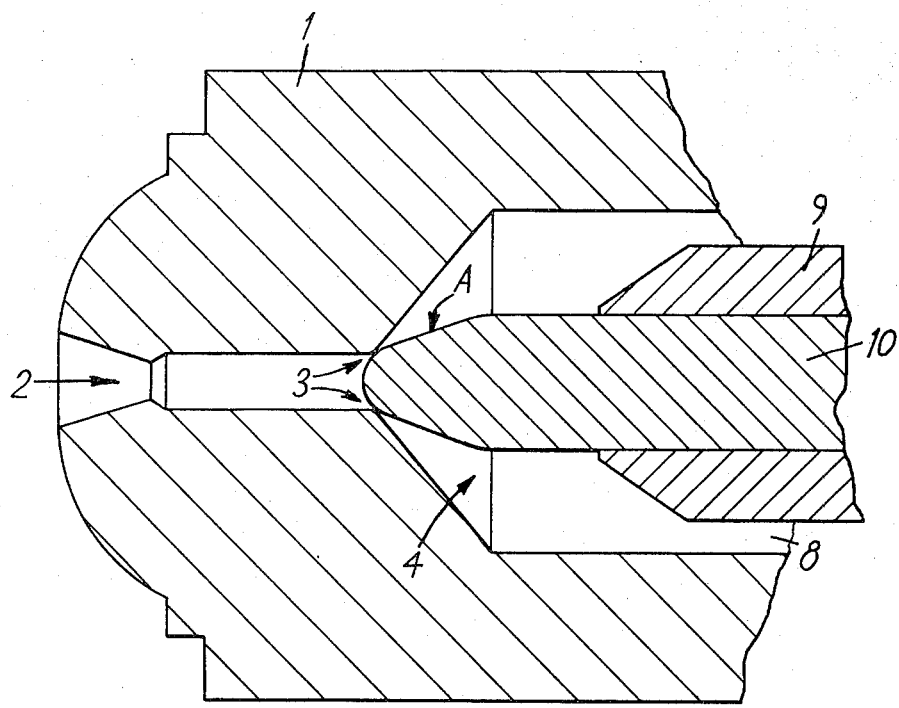

A preferred embodiment of the present invention will now be described by way of example with reference to the accompanying drawings (not to scale), wherein:

FIG. 1 is a side elevation, partly in section, of a nozzle device for an injection moulding machine; and FIG. 2 is an enlargement of a portion of FIG. 1.

Referring to the drawings, the nozzle device comprises a cylindrical nozzle 1 having an axial bore 2 which terminates in a throat 3 and communicates with a substantially conical chamber 4. Threaded into the nozzle 1 is a cylindrical valve body 5 having a passageway 6 communicating with a substantially conical chamber 7 from which six annularly spaced bores 8 (only one of which is shown) extend axially to communicate with the chamber 4. There is thus formed in the valve body 5 a flow distributor 9, which is drilled axially to receive a slidable valve member 10 and formed with an elongate transverse opening 11 in which is received a key 12 in the form of a bar extending through and projecting outwardly from each side of the opening 11. The downstream end of the valve member 10 is accurately machined to close the throat 3 without leakage and to provide a surface A (FIG. 2) of accurately known operating area. The valve body 5 carries a thrust assembly in the form of an anchor block 13 on which is pivotally mounted an operating lever 14 carring a thrust pad 15 which latter is engageable with a collar 16 axially slidable on the valve body 5. The key 12 engages with the collar 16. A fluid pressure-operable device for operation of the valve comprises a hydraulic double-acting piston-and-cylinder device 17, mountable on an injection moulding machine and connected by means of linkage 18 to the operating lever 14, the connection being by means of a rotary joint 19, for example a ball and socket. The hydraulic connections 20 are connectible to the hydraulic control of an injection moulding machine.

In use, the nozzle device is mounted on the plasticizing cylinder of injection moulding machine 21 and the hydraulic connections 20 are connected to the hydraulic control of the machine, which may be electronically programmed to include automatic operation of the valve. In operation of the machine, the throat 3 is closed by extending the piston of the device 17 to pivot the lever 14 to the left as shown in the drawing whereby the thrust pad causes the collar 16, key 12 and valve member 10 to move to the left; the pressure in the device 17 is held 'on'. The machine is operated to fill the passageway 6, chamber 7, bores 8 and chamber 4 with plastics material, up to the injection pressure, whereupon the device 17 is operated to reverse the pressure on the piston, thereby removing thrust from the valve member 10. The force applied by the pressurized material in the chamber 4 against the area A of the valve member 10 is resolvable into a force transverse of the axis thereof, and an axial force; the axial force causes the valve member 10 to open the throat permitting passage of the plastics material into the bore 2 and hence into a mould in the normal manner.

Modifications may, of course, be made in the above embodiment. For example, the thrust assembly may be arranged to operate more directly on the valve member, or to cause opening of the valve, and the valve may be operated pneumatically instead of hydraulically.

We claim:

1. A nozzle device for an injection moulding machine, comprising a nozzle portion and a valve body portion, a bore being defined in the nozzle and a throat being defined in the bore, a flow distributor being formed in the valve body portion to define therewith at least one passageway communicating with the bore, a valve member carried in the flow distributor and freely slidable axially relative thereto to open and close the throat, a transverse opening in the flow distributor, a key in the opening co-operating with the valve member, an axially slidable collar on the valve body portion co-operable with the key, a thrust assembly mounted on the valve body portion, and a fluid pressure-operable device mountable on an injection moulding machine and arranged and adapted to co-operate with the thrust assembly so that the fluid pressure device is operable to effect movement of the valve member to close the throat, and wherein the valve member has a downstream end profiled so that when moulding material is pressurized in the passageway of the valve body, a component of the pressure force acts in an axial direction with respect to the valve member to tend to move same to open the throat.

* * * * *